United States Patent [19]

Mizuno et al.

[11] 3,778,266

[45] Dec. 11, 1973

[54] METHOD OF FORMING A BLACK PATTERNED PORTION ON A PHOSPHOR SCREEN OF A CATHODE-RAY TUBE FOR COLOR TELEVISION SETS

[75] Inventors: Hideaki Mizuno, Tokyo; Toshio Konno, Yokohama; Naoki Akiyama, Yurigaoka, all of Japan

[73] Assignee: Victor Company of Japan, Limited, Kanagawa-Ku, Yokohama, Japan

[22] Filed: July 29, 1970

[21] Appl. No.: 59,301

[30] Foreign Application Priority Data

July 31, 1969 Japan ............................... 44/60574

[52] U.S. Cl. ............... 96/36.1, 117/106 C, 117/107

[51] Int. Cl. .............................................. G03c 5/00

[58] Field of Search ........................ 117/106 C, 107; 96/36.1

[56] References Cited

UNITED STATES PATENTS

| | | | |
|---|---|---|---|
| 3,582,701 | 6/1971 | Zeliotis | 96/36.1 |
| 3,614,503 | 10/1971 | Dietch | 96/36.1 |
| 3,615,460 | 10/1971 | Lange | 96/36.1 |
| 3,615,462 | 10/1971 | Szegho et al. | 96/36.1 |
| 3,558,310 | 1/1971 | Mayaud | 96/36.1 |
| 3,615,461 | 10/1971 | Kaplan | 96/36.1 |
| 3,614,504 | 10/1971 | Kaplan | 96/36.1 |
| 3,365,292 | 1/1968 | Fiore et al. | 96/36.1 |

*Primary Examiner*—Norman G. Torchin
*Assistant Examiner*—Edward C. Kimlin
*Attorney*—Louis Bernat

[57] ABSTRACT

A method of forming a black patterned portion on the inner surface of a face plate of a panel section of a cathode-ray tube for color television sets. The black patterned portion is formed in gaps between the phosphor dots to be formed on the inner surface of a face plate by deposition of a black patterned portion forming composition by vaporization.

12 Claims, 37 Drawing Figures

INVENTORS
HIDEAKI MIZUNO
TOSHIO KONNO
NAOKI AKIYAMA
BY
ATTORNEY

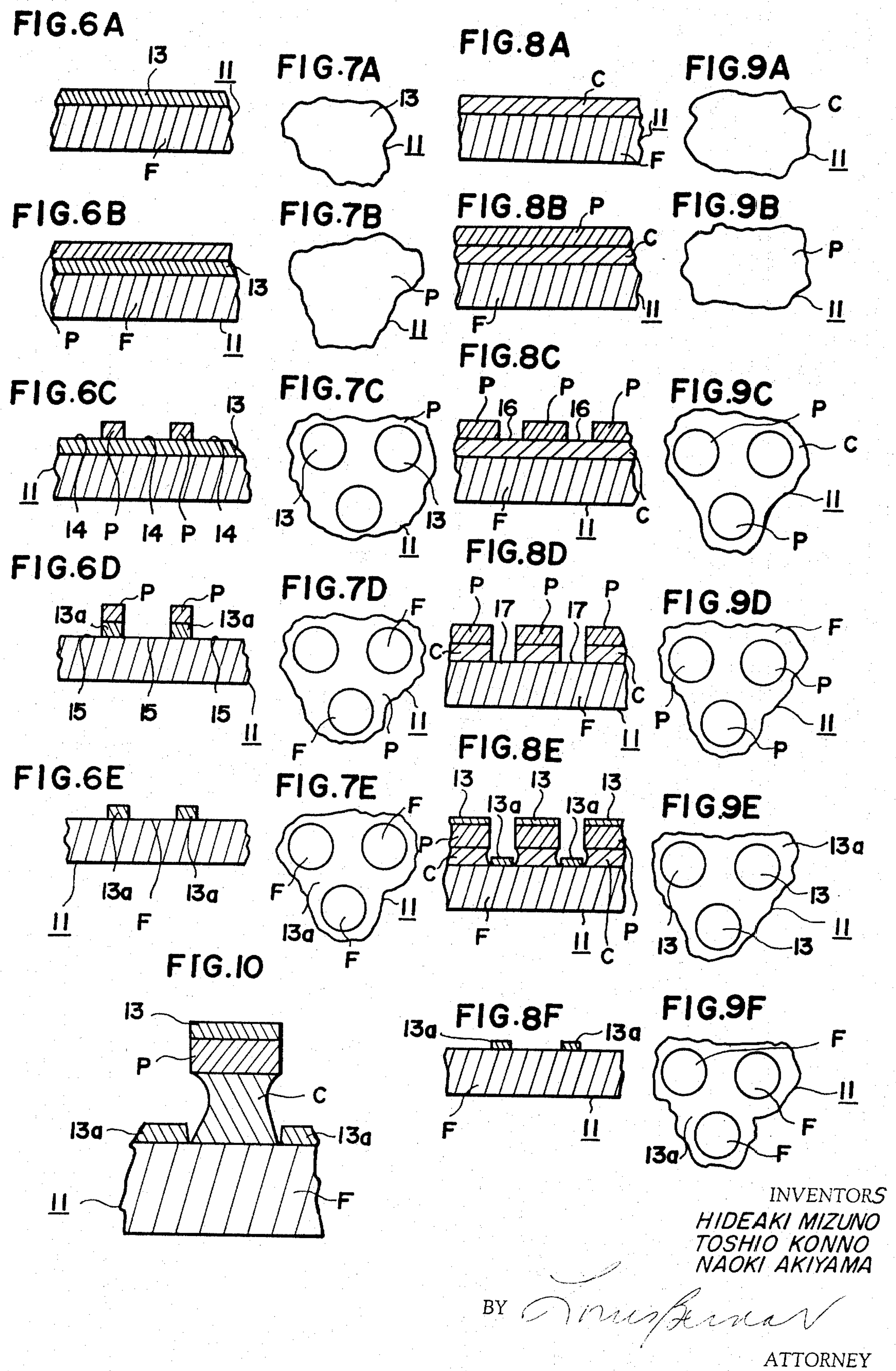
FIG. 6A, FIG. 6B, FIG. 6C, FIG. 6D, FIG. 6E, FIG. 7A, FIG. 7B, FIG. 7C, FIG. 7D, FIG. 7E, FIG. 8A, FIG. 8B, FIG. 8C, FIG. 8D, FIG. 8E, FIG. 8F, FIG. 9A, FIG. 9B, FIG. 9C, FIG. 9D, FIG. 9E, FIG. 9F, FIG. 10
INVENTORS
HIDEAKI MIZUNO
TOSHIO KONNO
NAOKI AKIYAMA
BY [signature]
ATTORNEY

INVENTORS.
HIDEAKI MIZUNO
TOSHIO KONNO
NAOKI AKIYAMA

BY [signature]
ATTORNEY

METHOD OF FORMING A BLACK PATTERNED PORTION ON A PHOSPHOR SCREEN OF A CATHODE-RAY TUBE FOR COLOR TELEVISION SETS

This invention relates to methods of forming a black patterned portion on a phosphor screen of a cathode-ray tube for color television sets. More particularly, the invention is concerned with method of forming a black patterned portion by vaporization in gaps between the phosphor dots to be formed on the inner surface of a face plate of a penel section of a cathode-ray tube for color televisions of the shadow-mask type.

Generally, a trio of phosphor dots of the three primary colors of green red and blue is formed on the inner side of the face plate of the panel section for each aperture of the shadow-mask in color television sets of the shadow-mask type, so that the phosphor screen contains repetitive patterns of red, green and blue-light emitting phosphors.

Color television cathode-ray tubes provided with a black patterned portion in the gaps between the color dots are known from U.S. Pat. No. 3,146,368. Hithertofore, a slurry process has been used for providing a black patterned portion. This process is not without disadvantages.

More specifically, the principal component of a slurry used for forming the black patterned portion is a carbon base powder of black color. The use of such material often causes irregularities in the edges of the black patterned portion. Moreover, the main component of the slurry adheres to the face plate with a low bonding force. This makes it necessary to pay special attention during subsequent phosphor plate producing operations, so that the black patterned portion may not be dislodged from the face plate (this renders the operation troublesome). Additional disadvantages are that it is not possible to provide well-defined phosphor dots because overlaps may be formed between the phosphor dots and black patterned portion. The black patterned portion does not function properly to absorb light because of the low bonding force with which it adheres to the face plate.

The present invention overcomes the aforementioned disadvantages of conventional methods for forming a black patterned portion on the phosphor screen.

Accordingly, a principal object of the present invention is to provide a method of forming by vaporization a black patterned portion on the inner surface of a face plate of a panel section of a cathode-ray tube of color television sets.

Another object of the invention is to provide a method of forming a black patterned portion accurately, readily, and promptly.

Another object of the invention is to provide a method of forming a black patterned portion which adheres to the face plate with a higher bonding force than has hitherto been possible.

Still another object of the invention is to provide a method of forming a black patterned portion by forming a coat deposited by vaporization of a black patterned portion forming composition.

Still another object of the invention is to provide a method of forming a black patterned portion by a coat deposited by vaporization of a black patterned portion forming composition comprising a material of smaller atomic number.

Still another object of the invention is to provide a method of forming a black patterned portion by forming a coat deposited simultaneously by vaporization of boron carbide and chromium or the like.

A further object of the invention is to provide a method of forming a black patterned portion on a face plate which markedly increases the efficiency of cathode-ray tubes for color television of the post-acceleration type.

Additional objects as well as features and advantages of this invention will become evident from the description set forth hereinafter when considered in conjunction with the accompanying drawings, in which:

FIGS. 6A to 6E and FIGS. 7A to 7E are longitudinal sectional side views and plan views, respectively, of a face plate portion showing different steps of forming process for the black patterned portion in a second embodiment of the invention;

FIGS. 8A to 8F and FIGS. 9A to 9F are longitudinal sectional side views and plan views, respectively, of a face plate portion in different steps of the process for forming the black patterned portion in a third embodiment of the invention;

FIG. 10 is a longitudinal sectional view, on an enlarged scale, of a portion of FIG. 8E;

Figures 1, 2, 3, 4A, 4B, 4C, 4D, 5A, 5B, 5C, 5D:
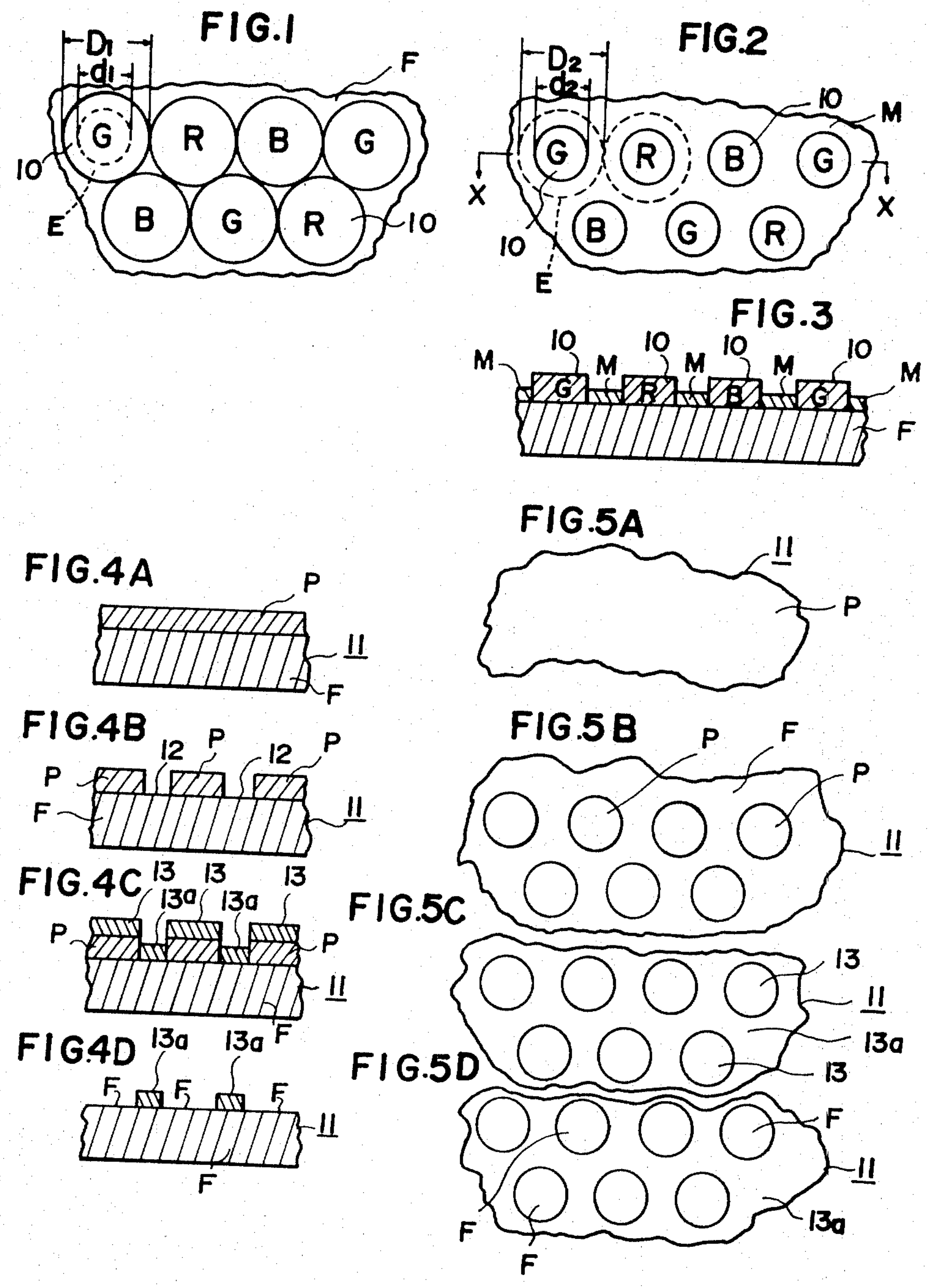
FIG. 1 is a plan view of a prior art triad pattern of phosphor dots on a phosphor screen of a cathode-ray tube for a conventional color television set of the shadow-mask type.
FIG. 2 is a plan view of a triad pattern of phosphor dots on a phosphor screen of a cathode-ray tube for a conventional color television set of the shadow-mask type in which a black patterned portion is provided.
FIG. 3 is a longitudinal sectional side view taken along the line X—X of FIG. 2.
FIGS. 4A to 4D and FIGS. 5A to 5D are longitudinal sectional side views and plan views, respectively, of a face plate portion in different steps of a process for forming a black patterned portion in a first embodiment of this invention.

In conventional phosphor screens, of three color phosphor dots are formed on cathode-ray tubes of the shadow-mask type color television sets of the prior art. It has hitherto been customary to arrange the phosphor dots as shown in FIG. 1 and provide each of them with a guard ring sufficiently great to prevent color contamination which might otherwise be caused by mislanding of an electron beam E (shown in a dotted line in FIG. 1). The beam impinges on a phosphor dot of each color, after passing through an aperture formed in the shadow-mask. The apertures are associated with a phosphor dot of each color in order to increase brightness and accuracy of colors in reproduced pictures. Increased utilization of an electron beam in conventional cathode-ray tubes of the shadow-mask type color television sets of the prior are has hitherto been hampered by color contamination. This has made it impossible to provide reproduced color pictures of higher brightness by using conventional phosphor screens.

The aforementioned disadvantage of the cathode-ray tubes of shadow-mask type color television sets of the prior art can be obviated by using cathode-ray tubes of the post-acceleration type. However, cathode-ray tubes of the post-acceleration type have a disadvantage in that a reduction in contrast or color contamination in reproduced pictures is liable to occur due to emission of radiation by the phosphor dots. Such radiation is produced by scattered electrons produced when the electron beam impinges on the phosphor screen. This contamination tendency is increased and becomes more conspicuous when each of the phosphor dots forming the phosphor screen is provided with a guard ring portion formed of a phosphor material. The ring is disposed outide an electron beam E impinging thereon. The guard ring is formed when the diameter $D_1$ of the phosphor dots is larger than the diameter $d_1$ of the electron beams E, as shown in FIG. 1. Full realization of the advantages from the use of the post-acceleration type cathode-ray tube has been hampered by inability to obviate this problem.

The body-color of the phosphors forming the phosphor screen of conventional cathode-ray tubes of both conventional and post-acceleration type cathode-ray tubes is white or a color of high brightness similar to white. The phosphor screen has a high reflection coefficient with respect to visible light. Accordingly, reflection of external light and multiple reflection of radiation emitted by the phosphor dots on the face plate may be caused by the phosphor screen. This greatly reduces the contrast of reproduced pictures.

Attempts have hitherto been made to prevent the reduction in contrast by using a face plate made of glass of lower light transmission coefficient. However, the use of glass of low light transmission coefficient has the disadvantage of further reducing the brightness of color television cathode-ray tubes.

The aforementioned disadvantages of color television cathode-ray tubes having a phosphor screen formed with phosphor dots of various colors and arranged as shown in FIG. 1 can be obviated by forming a black patterned portion M in gaps between the phosphor dots 10 on the screen, as shown in FIGS. 2 and 3.

As shown in FIGS. 2 and 3, the filling of the gaps between the phosphor dots with the black patterned portion M increases the diameter of each aperture of the shadow-mask. This increases the rate of utilization of the electron beam and increases the diameter $D_2$ of the electron beams E over the diameter $d_2$ of each phosphor dot without causing color contamination. The phosphor screen having the black patterned portion M on the face plate F has a low light reflection coefficient. Thus, it is possible to minimize a reduction in contrast in reproduced pictures, caused by reflection of external light and multiple reflection of radiation of the phosphor. Thus, the provision of the black patterned portion M permits to increase the brightness of color television cathode-ray tubes by using a face plate made by glass of high light transmission coefficient.

One embodiment of the method according to this invention will be explained with reference to FIGS. 4 and 5.

As shown in FIGS. 4A and 5A a photosensitive or resist material P made, for example, by Eastmen Kodak Company (trade name, Kodak Metal Etch Resist) is uniformly applied to the inner surface of a face plate F of a panel section 11 of a cathode-ray tube of a color television set. The panel section 11 is dried after completion of the step applying the photosensitive material. A shadow-mask formed with apertures of a diameter which is suitable to the forming of a phosphor screen on the face plate F by a known photo printing process is mounted on the panel section 11. Then, the coating of photosensitive material P is exposed to light transmitted through the apertures of the shadow-mask by using it as a pattern for exposure. The panel 11, with the coating of photosensitive material, is dipped in a liquid of Kodak Metal Etch Resist Developse (a trademark of the Eastman Kodak Company), and the coating is developed by the liquid. Then the exposed coat of photosensitive material P is treated with a spray of distilled water. The shadow-mask is removed from the exposed face plate 11. The unexposed portion 12 of the coating is removed so as to leave the photosensitive material P in the exposed portions of the coating for forming thereon phosphor dots.

A composition for forming a black patterned portion is deposited by vaporization on the inner side of the face plate F of the panel section 11 that has been treated by the aforementioned steps. As shown in FIG. 4C and FIG. 5C, a deposited coating is formed in the areas 13 of the photosensitive material P on the face plate F. At the same time a deposited coating 13a is formed on the face plate F which is to be left permanently as a black patterned portion on the face plate.

Then, a photosensitive material removing agent (for example, trichloroethylene xylene) is applied to the inner surface of the face plate F of the panel section 11 that has gone through the preceding steps. This removes the photosensitive material P from the areas 13 of the face plate in which phosphor dots are to be subsequently formed. This leaves the inner surface of the face plate formed only with a predetermined black patterned portion of the deposited coat 13a as shown in FIG. 4D and FIG. 5D.

Any suitable composition may be used for forming the deposited coat on the inner surface of the face plate so long as it has good light absorbing properties and it adheres well to the glass surface of the face plate F.

It has been found that the use of a composition comprising a material of smaller atomic number for vacuum deposition overcomes the aforementioned problems of the cathode-ray tube of the post-acceleration type, and it provides higher efficiency than any other composition.

The phosphor dots on the phosphor screen of the face plate F (on which the black patterned portion M is formed as shown in FIG. 2) occupy less total area than the phosphor dots 10 forming the triad pattern of a cathode-ray tube screen which are arranged as shown in FIG. 1. This is because the dots in FIG. 1 must form a guard ring of their own against mislanding of the electron beams E. Therefore, constrast is not lost in the phosphor screen with the black pattern, because the total area of the phosphor dots emitting radiation is smaller than the total area of the phosphor dots on the prior art (no black pattern) cathode-ray tube screen. As a result there is less impinging thereon of high energy of a large number of scattered electrons produced by the impinging of the primary electron beam on the phosphor dots, and fewer electrons are accelerated by the post-acceleration electric field. Thus, the mere provision of the black patterned portion is conducive to raduction in loss of contrast in the reproduced pictures as aforementioned.

It should be noted that, if a composition comprising a material of smaller atomic number is employed for forming a black patterned portion, it is possible to reduce the number of scattered electrons produced on the phosphor screen. This increases the contrast in reproduced pictures. Moreover, the use of the cathode-ray tube screen formed with a black patterned portion increases the brightness of reproduced pictures and improves the contrast of the image in reproduced pictures by varying the dimension of the apertures of the shadow-mask (the transmission coefficient for electron beam) electrode or varying the thickness of the metal back coating. Thus, the present invention contributes greatly to the practical use of cathode-ray tube of the post-acceleration type for color television sets.

Preferably, the composition used comprises boron carbide, for example, as a material of smaller atomic number to be deposited on the face plate by vaporization. It has been found that the addition of a small proportion of chromium to boron carbide increases the bonding force by which the vacuum deposited coat of composition is adhered to the inner surface of the face plate. This composition controls the tone of color of the formed back patterned portion.

More specifically, the vacuum deposited coat consisting entirely of boron carbide is slightly brownish in color and boron carbide is relatively low in reactivity. A material, such as chromium, has suitable reactivity and aids in forming a vacuum deposited coat of black. This material may be used in combination with boron carbide in the present invention.

One example of the process for formation of a coat by simultaneous thermal vaporization of the materials will now be explained.

Layers of boron carbide and chromium are superposed one on another and disposed in a crucible of a single electron beam heating device. They are heated by means of an electron beam and deposited by vaporization on the inner surface of the face plate. Chromium has a lower melting point and a higher vapor pressure and is first vaporized. It forms a chromium layer of high bonding force on the inner surface of the face plate. Then, a layer of a mixture of chromium and boron carbide is formed, successively, on the chromium layer on the face plate. Thereafter, a layer consisting only of boron carbide is superposed on the mixture layer. Therefore, a black coat of two materials deposited by vaporization can be formed integrally with the inner surface of the face plate.

Figure 12:
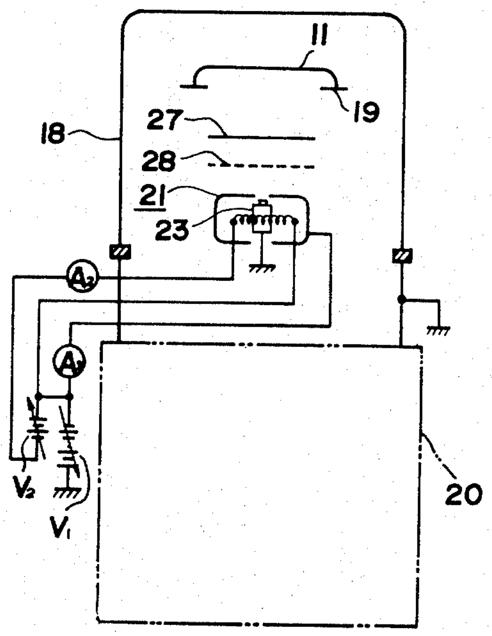
FIG. 12 is a schematic longitudinal sectional view of one embodiment of the apparatus for forming a coating by vapor deposition according to this invention.
Figure 13:
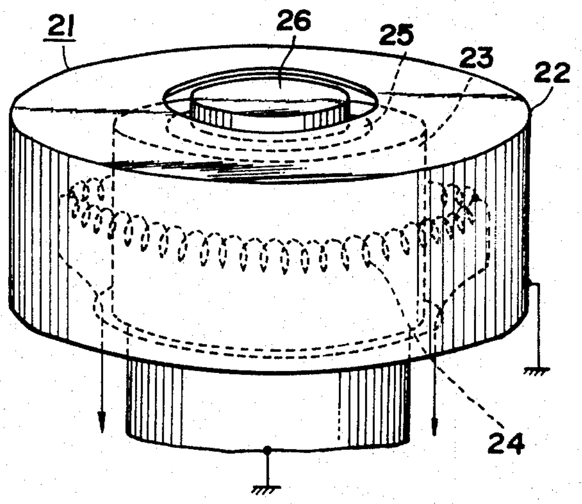
FIG. 13 is a perspective view of a device for heating a material to be deposited by vaporization.

The method of and apparatus for forming a deposited coat will now be explained in detail with reference to FIGS. 11, 12 and 13.

The panel section 11 shown in FIGS. 4 4B and 5B is supported by holders 19, 19 in a belljar 18, in such a manner that the inner surface of the face plate F of the panel section 11 faces downwardly. The belljar 18 is hermetically sealed and evacuated by a diffusion pump 20 before the deposition step is carried out. As shown in an enlarged view in FIG. 13, a single electron beam heating device 21 comprises a crucible 23 surrounded by an electrode 22, and a cathode filament 24 surrounding the crucible 23. A layer of boron carbide in powder form 25 (melting point, 2,450°C) is placed in the crucible 23. A chromium layer 26 (melting point, 2,176°C) in powder form or in solid form is superposed on the boron carbide layer 25.

The belljar 18 is evacuated by the diffusion pump 20 so as to produce a vacuum of $10^{-5}$ to $10^{-6}$ mmHg in the belljar 18. Then, the cathode filament 24 is heated by a current $A_2$ of 80 amperes at a voltage $V_2$ of 7 volts to produce thermal electrons. The stream of thermal electrons produced is bent by an electric field formed by the electrode 22. For this, a current $A_1$ of 50 miliamperes at a voltage $V_1$ of 5 kilovolts is passed through electrode 22. The electrons impinge on and heat the layers of boron carbide 25 and chromium 26 in the crucible 23.

A shutter 27 is closed and the layers 25 and 26 are preheated for 2 to 3 minutes. This preheating causes the gas in the layers 25 and 26 to escape therefrom. The chromium layer 26 is dissolved. A portion of the molten chromium finds its way into the boron carbide layer 25 so as to form a mixture of the two substances.

After preheating, the shutter 27 is opened, and the voltage applied to the electrode 22 is raised gradually from 5 kilovolts to 8 kilovolts in about 5 minutes. Chromium, which has a lower melting point then boron carbide, is the first to turn into vapor and be deposited on the face plate F and on the areas of photosensitive material P on the face plate F. A coating of about 1,000 A thickness is formed.

Figure 11:
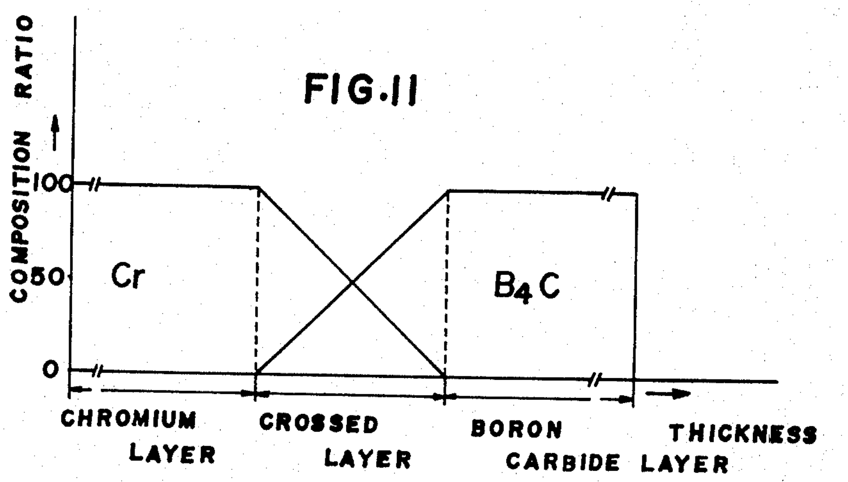
FIG. 11 is a graphical view presented in explanation of a composition ratio of a coating deposited by vaporization.

If the voltage applied to the electrode 22 is maintained at 8 kilovolts for additional 5 minutes, then the aforementioned mixture of the two substances is vaporized, and it forms a layer of mixture of the two substances with a composition ratio gradient shown in FIG. 11. This layer has a thickness of about 500 A on the chromium layer on the face plate. There is no borderline between the chromium layer and the mixture layer. The current $A_1$ flowing through at a voltage of 8 kilovolts is about 100 miliamperes.

Further heating results in the remainder of the boron carbide layer 25 being vaporized and deposited on the face plate F, in a layer about 2,000 A thick and over the mixture layer on the face plate. There is no borderline between the boron carbide layer and mixture layer.

There should not be a large amount of leakage electrons deriving from the stream of electrons emanating from the heating device 21 or electrons which are reflected by the material to be vaporized and deposited in the crucible 23 after impinging thereon. These electrons might impinge on the face plate which is a base for a deposited coat. The base then be heated or charged, so that the resultant discharge might cause the deposited coat to peel off the base.

The air contained in the material or materials to be vaporized and deposited in the crucible 23 might expand by heating. The material in powder form might be scattered by the bumping phenomenon taking place when the material is vaporized. The scattered powder might reach the base and contaminate the deposited coat and cause it to peel.

In order to prevent deleterious influences of these phenomena, a collector electrode 28 of wire-netting may be used between the crucible 23 and panel section 11, having the face plate F which constitutes the base. The collector electrode 28, generally has a ground potential, but it may also have a suitable bias potential. The use of the collector electrode 28 is effective to provide an electrostatic shield for absorbing the leakage electrons and charged particles of material to be vaporized and deposited. This prevents the deposited coat from peeling of the face plate F.

It is to be understood that the thicknesses of the deposited coat described above are for illustration purpose only. The invention is not limited to the particular values described. The thicknesses of the deposited coat may vary depending on the kind of material used as a deposition material.

The second embodiment of the invention will now be explained with reference to FIGS. 6 to 7. In this embodiment, the order of steps for applying a coat of composition by vaporization for forming a black patterned portion differs from the order of steps in the first embodiment.

As shown in FIGS. 6A and 7A, a composition used for forming the black patterned portion is uniformly applied to the entire area on the inner surface of the face plate F of the panel section 11 in the form of a deposited coat 13. The explanation of the composition to be deposited by vaporization, as well as the method of and apparatus for forming the deposited coat, shall be omitted because they are as explained above.

A photosensitive material P, such as AZ-111 (trademark) made by the Shipley Company, is uniformly applied as shown in FIGS. 6B and 7B over the deposited coat 13 on the panel section 11 produced by the aforementioned step.

A shadow-mask is formed with apertures of the size suitable to the production of a phosphor screen by a known photo printing process. The mask is mounted on the panel section 11, which is dried after being treated in the aforementioned step. Selected areas of the coating P on the inner surface of the face plate F are exposed under the suitable condition to a light source through the apertures of the shadow-mask used as the pattern for exposure.

After exposure, the shadow-mask is removed from the panel section 11. The coating P is developed by a developing solution AZ-303 (trademark) made by the Shipley Company; then, the coating P on the deposited coat 13 is treated with a spray of distilled water to remove the photosensitive material on exposed areas of the photosensitive material layer. This leaves the coating of photosensitive material P in only a portion of the face plate F which corresponds to a desired black patterned portion ultimately as shown in FIGS. 6C and 7C, with the other exposed portion 14 of the material P being removed. The deposited coat 13 is exposed to view in the area of portion 14, on the face plate F.

Then, an etching solution (consisting of a water solution of ferric chloride, for example) is applied, as by spraying, to the deposited coat 13 in the portions 14 on the face plate F. This solution removes the coat 13 in portions other than the portion 13a which is left unremoved to ultimately form a black patterned portion on the inner surface of the face plate F, as shown in FIGS. 6D and 7D. The surface of the face plate is exposed to view in portions 15 from which deposited coat has been removed by the etching solution.

Finally, an agent (for example, acetone) for removing the photosensitive material P is applied to the inner surface of the face plate F of the panel section 11. This removes the photosensitive material P remaining on the portion 13a, which are to constitute the black patterned portion on the surface of the face plate F. This provides a panel portion which is formed with a predetermined black patterned portion in 13a on the inner surface of the face plate F, as shown in FIGS. 6E and 7E.

A third embodiment of the invention will now be explained with reference to FIGS. 8 to 10.

As shown in FIGS. 8A to 9A, a composition *c*, such as Color Coat (trade name) produced by Fuji Chemical Company in Japan, which can be removed with a solvent in the next succeeding step, is uniformly applied to the inner surface of the face plate F of the panel section 11. The composition *c* is a solvent comprising a pigment (such as zinc oxide) dissolved in a solvent (such as butyl alcohol dissolving a phenol resin). It is to be understood that the composition *c* is not limited to the material called Color Coat. However, for the sake of convenience, the following steps will be explained as by using the Color Coat.

A photosensitive material P, such as Kodak Metal Etch Resist (trade name) referred to above, is uniformly applied to the coat of Color Coat *c* on the panel section 11, as shown in FIGS. 8B and 9B.

A shadow-mask is formed with apertures of a size which is suitable for producing a phosphor screen on the face plate F by a known photo printing process. The shadow-mask is mounted on the panel section which is dried after the preceding step. Selected areas of the coat of photosensitive material P on the face plate F are exposed to light passed through the apertures of the shadow-mask used as the pattern of exposure. After exposure, the shadow-mask is removed from the panel section 11. The portions of photosensitive material P on the coating of Color Coat *c* are treated and developed by the same way as the first embodiment. Distilled water removes the photosensitive material P in unexposed portions 16, as shown in FIGS. 8C and 9C. The coating of Color Coat *c* is exposed to view in the portion 16. The unexposed coating of Color Coat *c* in the portion 16 of the face plate F of the panel section 11 is removed, as by spraying with a color coat removing agent, consisting mainly of a water solution of sodium hydroxide, for example. The resulting pattern is as shown in FIGS. 8D and 9D. The reference numeral 17 indicates a portion in which the coating of Color Coat *c* has been removed to expose the surface of the face plate F to view.

Finally, a composition for forming a black patterned portion on the inner surface of the face plate F of the panel section 11 is deposited by vaporization. In this last step, a deposited coat 13a is formed in the portion 17 in which the surface of the face plate F is exposed to view. The coat 13a forms the black patterned portion of the cathode-ray tube screen. At the same time, a deposited coat 13 of the composition is also formed on the coat of photosensitive material P formed on the coating of Color Coat *c*.

The explanation of the composition to be deposited by vaporization, as well as the method of and apparatus for forming the vacuum deposited coat, shall be omitted because they have already been explained previously.

Then, an agent (a water solution of sodium hydroxide) is applied to the inner surface of the face plate F of the panel section 11 to remove the Color Coat *c* and photosensitive material P remaining on the face plate F. This provides a panel section which is formed with a black patterned portion of the deposited coat 13a on the inner surface of the face plate F as shown in FIGS. 8F and 9F.

It will be seen that the third embodiment comprises the additional steps of applying a coating of Color Coat *c* and removing the same besides the steps of the first embodiment. However, the third embodiment offers advantages in that the provision of the coating of Color Coat *c* markedly increases the workability of the cathode-ray tube screen. The formation of a black patterned portion by deposition of vaporized composition is facilitated. A finely finished black patterned portion can be obtained.

To be more specific, maintenance of good resolution limits to the thickness of the coat of a photosensitive material P. The the maximum thickness would be about 1 micron meter. A composition to be deposited by vaporization is applied to the surface of the panel section 11 as shown in FIGS. 4B and 5B. To convert the panel section 11 into a state shown in FIGS. 4C and 5C, the composition is liable to be deposited in such a manner that the portions 13 of the deposited coat and the portion 13a of the deposited coat are not demarcated, but are continuous with one another. Stated differently, a continuous layer of vacuum deposited composition covers both the portions 13 of the surface of the face plate F which are covered with the photosensitive material P and the portions 13a which are not covered with the photosensitive material P. If this is the case, the application of the photosensitive material removing agent to the panel section 11 shown in FIGS. 4 and 5 will not be able to achieve satisfactory results in removing the residual photosensitive material P.

In the embodiment shown in FIGS. 8 to 10, it is possible to apply a coating of Color Coat *c* of suitable thickness, such as a thickness of 10 to several scores of micron meters, or more. This coating is applied on the surface of the panel section 11. In the color Coat removing step in which the panel is converted from a state shown in FIGS. 8C and 9C to a state shown in FIGS. 8D and 9D, the portions of coating of Color Coat *c* to be left on the face plate F have side walls which are eroded by the action of the Color Coat removing agent. This prevents the portions 13 and the portions 13a of the deposited coat from being connected to one another when the composition for forming a black patterned portion is deposited by vaporization in the succeeding step. This makes it easy to remove the coating of Color Coat *c* thoroughly in the final step.

From the foregoing description, it will be appreciated that the method of forming a black patterned portion on the cathode-ray tube screen for color television sets, according to this invention, is directed to the formation of such black patterned portion the deposition of a composition by vaporization. This method obviates the various problems encountered in a conventional slurry process.

The black patterned portion formed by the method according to this invention has many advantages. The workability of the panel sction of the cathode-ray tube is increased; a black patterned portion can be formed accurately and promptly; the black patterned portion formed by the method according to this invention is adhered with the face plate with a high bonding force; the black patterned portion formed by the method according to this invention is high in density so that contamination of the phosphor with the composition of the black patterned portion is prevented; and the black patterned portion formed by the method according to this invention has high light absorbing characteristics because the black patterned portion is maintained in intimate contact with the inner surface of the face plate.

Although the drawings and description relate to preferred embodiments of this invention, it should be understood that there is no intention to limit the invention to the disclosed constructions and processes and instead it is intended that the invention should extend to all alternative embodiments, and equivalent constructions and processes falling within the scope of the following claims.

What we claim is:

1. A method of forming a black patterned portion on a phosphor screen of a cathode-ray tube for color television sets comprising the steps of coating the inner surface of a face plate of a panel section of the cathode-ray tube with a layer of photosensitive material, mounting a shadow-mask on the panel section, exposing said photosensitive material layer to a light source through apertures of the shadow-mask screens by a photo printing process, removing said shadow-mask from said panel section, subjecting the photosensitive material layer to a developing treatment to remove the photosensitive material from unexposed portions of the photosensitive material layer, depositing a first material of small atomic number of high melting point and a black second material of lower melting point on the inner surface of the face plate of the panel section by vaporization while the panel is in a vacuum, and removing the remainder of said photosensitive material from the inner surface of the face plate of the panel section.

2. A method of forming a black patterned portion on a phosphor screen of a cathode-ray tube for color television sets as defined in claim 1 wherein said step of depositing said first and second materials comprises the steps of piling said two materials in a stack of successive layers in a crucible, and heating in a vacuum and vaporizing said stack for first depositing said black material of lower melting point on the inner surface of the face plate, then depositing a mixture of said two materials on said black material layer, said mixture having a mixture composition ratio gradient, and finally depositing said material of high melting point on said layer of said mixture of said two materials.

3. A method of forming a black patterned portion on a phosphor screen of a cathode-ray tube for color television sets as defined in claim 1 wherein said material of small atomic number and high melting point is boron carbide and said black material of lower melting point is chromium, and wherein said step of depositing said first and second materials comprises the steps of piling said boron carbide and chromium in a stack in successive layers in a crucible, and heating in a vacuum and vaporizing said stack for first depositing said chromium on the inner surface of the face plate of the panel section, then depositing a mixture of said boron carbide and chromium on said chromium layer, said mixture having a mixture composition ratio gradient, and finally depositing boron carbide on said layer of said mixture of boron carbide and chromium.

4. A method of forming a black patterned portion on a phosphor screen of a cathode-ray tube for color television sets comprising the steps of applying on the inner surface of a face plate of a panel section of the cathode-ray tube a coat of material which can readily be removed with a removing agent in a subsequent step, coating said coat of readily removable material with a layer of photosensitive material, mounting a shadow-mask on the panel section, exposing said photosensitive material layer to a light source through apertures of the shadow-mask by a photo printing process, removing said shadow-mask from said panel section, subjecting the photosensitive material layer to a developing treatment to remove the photosensitive material from unexposed portions of the photosensitive material layer, applying a removing agent for removing said readily removable material which is exposed after the photosensitive material layer is removed therefrom, depositing a black patterned portion forming composition comprising a material of small atomic number and high melting point and a black material of lower melting point on the inner surface of the face plate of the panel section by simultaneously vaporizing said two materials, and removing the remainder of said readily removable material from the inner surface of the face plate of the panel section with a removing agent.

5. A method of forming a black patterned portion on a phosphor screen of a cathode-ray tube for color television sets as defined in claim 4 wherein said step of depositing a black patterned portion forming composition comprising a material of small atomic number and high melting point and a black material of lower melting point on the inner surface of the face plate of the panel section by vaporizing said two materials simultaneously comprises the steps of piling said two materials in a stack in successive layers in a crucible, and heating in a vacuum and vaporizing said stack for first depositing said black material of lower melting point on the inner surface of the face plate, then depositing a mixture of said two materials on said black material layer, said mixture having a mixture composition ratio gradient, and finally depositing said material of high melting point on said layer of said mixture of said two materials.

6. A method of forming a black patterned portion on a phosphor screen of a cathode-ray tube for color television sets comprising the steps of applying on the inner surface of a face plate of a panel section of the cathode-ray tube a coat of paint comprising a pigment such as zinc oxide dissolved in a solvent such as a phenol resin dissolved in butyl alcohol, coating said coat of paint on said panel section with a layer of photosensitive material, mounting a shadow-mask on the panel section, exposing said photosensitive material layer to a light source through apertures of the shadow-mask by a photo printing process, removing said shadow-mask from said panel section, subjecting the photosensitive material layer to a developing treatment to remove the photosensitive material from an unexposed portion of the photosensitive material layer, applying a water solution of sodium hydroxide for removing the paint from the portion of said paint coat which is exposed after the photosensitive layer is removed therefrom, depositing a black pattern forming composition comprising boron carbide and chromium on the inner surface of the face plate of the panel section by simultaneously vaporizing said two materials, and applying a water solution of sodium hydroxide for removing the remainder of said paint from the inner surface of the face plate of the panel section.

7. A method of forming a black patterned portion on a phosphor screen of a cathode-ray tube for color television sets as defined in claim 6 wherein said step of depositing boron carbide and chromium by vaporizing them simultaneously comprises the steps of piling boron carbide and chromium in a stack in successive layers in a crucible, heating in a vacuum and vaporizing said stack for first depositing chromium on the inner surface of the face plate of the panel section, then depositing a mixture of boron carbide and chromium with a mixture composition ratio gradient, and finally depositing boron carbide on said layer of said mixture of boron carbide and chromium.

8. A method of forming a black patterned portion on a phosphor screen of a cathode-ray tube for color television sets, comprising the following steps:

a. applying on the inner surface of a face plate of a panel section of the cathode-ray tube a layer of pigment which can be removed by a first solvent but cannot be removed by a second solvent,
b. coating said layer with photosensitive material which is soluble in the second solvent before being exposed to light, but insoluble in the second solvent after having been exposed to light,
c. placing an apertured shadow-mask over the coating,
d. exposing said coating to a light source shining through the apertures of the shadow-mask,
e. removing said shadow-mask,
f. treating the coating of photosensitive material with said second solvent to remove the unexposed portions of the photosensitive material and to uncover the portions of the layer corresponding to the unexposed portions of the photosensitive coating,
g. treating the uncovered portions of the layer with said first solvent to remove the uncovered portions of the layer and to expose the portions of the face plate corresponding to the uncovered portions of the layer,
h. vaporization depositing a composition comprising a material of small atomic number and high melting point and a black material of lower melting point on the uncovered portions of the face plate and the exposed portions of the photosensitive material, and
i. treating with said first solvent the portions of the layer which are covered with the exposed portions of the photosensitive material layer to remove the portions of the layer which are covered with the exposed portions of the photosensitive material layer which removes the photosensitive material and the vapor-deposited composition coefficient which cover said portions of the layer whereby the portions of the face plate corresponding to the exposed portions of the photosensitive material layer are uncovered.

9. The method of forming a black patterned portion as defined in claim 8 wherein said pigment comprises zinc oxide dissolved in phenol resin dissolved in butyl alcohol.

10. The method of forming a black patterned portion as defined in claim 9 wherein said first solvent comprises a water solution of sodium hydroxide.

11. The method of forming a black patterned portion as defined in claim 8 wherein the step of applying said layer comprises the step of forming the pigment layer with a thickness of 10 to several scores of microns.

12. The method of forming a black patterned portion as defined in claim 8 wherein said step of vapor deposition comprises the steps of:

h1. piling boron carbide and chromiun in a stack of successive layers in a crucible in a heating device which emits electron beams into the crucible, h2. placing the panel and said heating device in a vacuum condition to vaporize said stack, h3. flowing into said crucible predetermined electron beam currents for a predetermined period of time and thereafter increasing the predetermined electron beam currents, whereby a chromium layer is first deposited on the inner surface of the face plate, then a mixture layer of the chromiun and boron carbide is deposited on said chromiun layer, and finally a boron carbide layer is deposited on said mixture layer, said mixture layer having a continuously decreasing composition of chromium from the chromium layer to the boron carbide layer.

* * * * *